United States Patent
Pei et al.

(10) Patent No.: US 11,467,651 B2
(45) Date of Patent: Oct. 11, 2022

(54) PHOTODYNAMIC ENERGY ELECTRONIC LABEL, WORKING METHOD THEREOF, MANAGING METHOD AND MANAGING APPARATUS THEREOF

(71) Applicant: BOE TECHNOLOGY GROUP CO., LTD., Beijing (CN)

(72) Inventors: Hongyan Pei, Beijing (CN); Wei Deng, Beijing (CN); Huawei Yu, Beijing (CN); Shijie Cao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 341 days.

(21) Appl. No.: 16/499,994

(22) PCT Filed: Apr. 10, 2019

(86) PCT No.: PCT/CN2019/082115
§ 371 (c)(1),
(2) Date: Oct. 1, 2019

(87) PCT Pub. No.: WO2019/228075
PCT Pub. Date: Dec. 5, 2019

(65) Prior Publication Data
US 2021/0349521 A1   Nov. 11, 2021

(30) Foreign Application Priority Data

May 30, 2018  (CN) .......................... 201810538854.3

(51) Int. Cl.
*G06F 1/00* (2006.01)
*G06F 1/3287* (2019.01)
(Continued)

(52) U.S. Cl.
CPC .......... *G06F 1/3287* (2013.01); *G06F 1/3243* (2013.01); *G06F 13/24* (2013.01);
(Continued)

(58) Field of Classification Search
CPC ...... G06F 1/3287; G06F 13/24; G06F 1/3243; G06F 2213/24; G06K 19/0704; H02J 7/0068; H02J 7/35
(Continued)

(56) References Cited

U.S. PATENT DOCUMENTS 5,160,920 A * 11/1992 Harris ...................... G09G 3/18
714/E11.017
5,910,653 A *  6/1999 Campo .................... G09F 3/208
250/214 AL (Continued)

FOREIGN PATENT DOCUMENTS

CN   201038824 Y   3/2008
CN   101546388 A   9/2009
(Continued)

OTHER PUBLICATIONS

International Search Report of PCT/CN2019/082115 in Chinese, dated Jun. 27, 2019, with English translation.

*Primary Examiner* — Volvick Derose
(74) *Attorney, Agent, or Firm* — Collard & Roe, P.C.

(57) ABSTRACT

The present disclosure provides a photodynamic energy electronic label, a working method thereof, a managing method and a managing apparatus thereof. The photodynamic energy electronic label includes a photodynamic energy converter configured to convert light energy into electric energy, and a triggering circuit connected with the photodynamic energy converter and configured to send out a triggering signal to enable the photodynamic energy electronic label to be in a working state when an output of the photodynamic energy converter reaches a set condition.

18 Claims, 4 Drawing Sheets

(51) Int. Cl.
*G06F 1/3234* (2019.01)
*G06F 13/24* (2006.01)
*G06K 19/07* (2006.01)
*H02J 7/00* (2006.01)
*H02J 7/35* (2006.01)
*G06F 1/3203* (2019.01)
*G06F 1/3215* (2019.01)

(52) U.S. Cl.
CPC ........ *G06K 19/0704* (2013.01); *H02J 7/0068* (2013.01); *H02J 7/35* (2013.01); *G06F 1/3203* (2013.01); *G06F 1/3215* (2013.01); *G06F 2213/24* (2013.01)

(58) Field of Classification Search
USPC ........................................................ 713/323
See application file for complete search history.

(56) References Cited

U.S. PATENT DOCUMENTS

| | | | | |
|---|---|---|---|---|
| 6,130,603 | A * | 10/2000 | Briechle | G06F 3/1431 |
| | | | | 455/343.1 |
| 2005/0150949 | A1* | 7/2005 | Goel | G06K 19/0723 |
| | | | | 235/383 |
| 2005/0152108 | A1* | 7/2005 | Goel | G06Q 10/087 |
| | | | | 361/679.01 |
| 2009/0273443 | A1* | 11/2009 | Nilsson | G06F 3/147 |
| | | | | 340/5.91 |
| 2010/0001924 | A1* | 1/2010 | Nobutsugu | G09F 9/302 |
| | | | | 345/1.1 |
| 2011/0205201 | A1* | 8/2011 | Lorkowski | G06F 3/147 |
| | | | | 345/207 |
| 2012/0000974 | A1* | 1/2012 | Hung | G06F 3/147 |
| | | | | 235/375 |
| 2012/0008626 | A1* | 1/2012 | Brederveld | G06Q 10/087 |
| | | | | 370/392 |
| 2015/0310775 | A1* | 10/2015 | Cho | G06Q 10/0833 |
| | | | | 40/299.01 |
| 2016/0260163 | A1* | 9/2016 | Sjödin | G09F 3/208 |
| 2017/0124826 | A1* | 5/2017 | Maunu | G08B 13/246 |
| 2017/0317511 | A1* | 11/2017 | Keysar | H02J 7/345 |
| 2018/0366040 | A1* | 12/2018 | Rössl | G09G 5/393 |
| 2021/0349521 | A1* | 11/2021 | Pei | G06F 13/24 |

FOREIGN PATENT DOCUMENTS

| | | | | |
|---|---|---|---|---|
| CN | 103955723 A | | 7/2014 | |
| CN | 108764427 A | | 11/2018 | |
| EP | 2 315 162 A1 | | 4/2011 | |
| GB | 2479230 A | * | 10/2011 | ............... G06F 1/32 |
| KR | 101095265 B1 | * | 10/2011 | ............... G06F 1/32 |

* cited by examiner

PHOTODYNAMIC ENERGY ELECTRONIC LABEL, WORKING METHOD THEREOF, MANAGING METHOD AND MANAGING APPARATUS THEREOF

CROSS REFERENCE TO RELATED APPLICATIONS

This application is the National Stage of PCT/CN2019/082115 filed on Apr. 10, 2019, which claims priority under 35 U.S.C. § 119 of Chinese Application No. 201810538854.3 filed on May 30, 2018, the disclosure of which is incorporated by reference.

TECHNICAL FIELD

Embodiments of the present disclosure relate to a photodynamic energy electronic label, a working method thereof, a managing method and a managing apparatus thereof.

BACKGROUND

Currently, electronic labels are used for shelf labels in places such as supermarkets, warehouses, etc., which can reduce workload of replacing paper labels and shorten operation time of updating prices.

However, the existing electronic label is generally powered by a battery; when powered by the battery, the electronic label has a service life of about 3 to 5 years, which is relatively short; and when the battery runs out, the battery or the electronic label needs to be replaced, causing extra work.

SUMMARY

Embodiments of the present disclosure relate to a photodynamic energy electronic label, a working method thereof, a managing method and a managing apparatus thereof, which are capable of improving the service life of the electronic label.

At a first aspect, an embodiment of the present disclosure provides a photodynamic energy electronic label, the photodynamic energy electronic label comprises a photodynamic energy converter and a triggering circuit, the photodynamic energy converter is configured to convert light energy into electric energy, and the triggering circuit is connected with the photodynamic energy converter and configured to send out a triggering signal to enable the photodynamic energy electronic label to be in a working state when an output of the photodynamic energy converter reaches a set condition.

For example, the photodynamic energy electronic label further comprises a processor, the processor is connected with the triggering circuit and configured to receive the triggering signal and proceed to a working state according to triggering of the triggering signal, so as to enable the photodynamic energy converter to be in the working state.

For example, the photodynamic energy electronic label further comprises a battery and a battery managing module, the battery is configured to supply power to the photodynamic energy electronic label, and the battery managing module is connected with the photodynamic energy converter, the battery and the processor, and configured to supply the electric energy provided by the photodynamic energy converter to the processor and the battery.

For example, the processor is a Micro Control Unit, and the triggering signal is an Input/Output port interrupt triggering signal.

For example, the set condition is any one of: an absolute value of a change value of the output of the photodynamic energy converter is greater than or equal to a set value; and the output of the photodynamic energy converter reaches a preset value in a first set time.

For example, the output is a voltage signal or a current signal.

For example, the triggering circuit includes: an analog-to-digital converting module, configured to convert a voltage signal output by the photodynamic energy converter into a digital signal; a latch, configured to latch the digital signal output by the analog-to-digital converting module for a set period T; a digital-to-analog converting module, configured to convert the digital signal output by the latch into an analog voltage signal; a voltage dividing circuit, configured to carry out voltage division on the analog voltage signal output by the digital-to-analog converting module, to output a voltage-divided signal; and a comparator, configured to compare the voltage-divided signal output by the voltage dividing circuit to a voltage signal output by the photodynamic energy converter, and when an absolute value of a difference between a voltage signal currently output by the photodynamic energy converter and a voltage signal output by the photodynamic energy converter in a previous period is greater than or equal to the set value, the comparator outputs the triggering signal.

For example, the working state of the photodynamic energy electronic label includes an updating state and a communicating state, and the processor is configured to trigger different modules to work or sleep in different working states.

For example, the processor is further configured to: after being triggered to proceed to the working state, if a signal sent by a managing apparatus is not received in a second set time, proceed to a sleeping state again; and after receiving the signal sent by the managing apparatus, when no triggering signal or no any signal sent by the managing apparatus is received in a third set time, proceed to the sleeping state and enable the photodynamic energy electronic label to proceed to a sleeping state.

For example, the photodynamic energy electronic label further comprises: a wireless communicating module, configured to implement data transceiving of the photodynamic energy electronic label and the managing apparatus; and a display screen driving circuit, configured to provide display contents to a display screen, and in the communicating state, the processor triggers the wireless communicating module to work, and in the updating state, the processor enables the wireless communicating module to sleep, triggers the displaying screen driving circuit to work and updates the display contents.

At a second aspect, an embodiment of the present disclosure provides a managing method of the photodynamic energy electronic label according to the first aspect, the managing method comprises: after controlling light intensity to be changed, sending a querying signal to the photodynamic energy electronic label to query a state of the photodynamic energy electronic label; and determining a photodynamic energy electronic label which is not normally triggered to proceed to a working state as a to-be-processed label.

For example, before the determining the photodynamic energy electronic label which is not normally triggered to proceed to the working state as the to-be-processed label, the managing method further comprises: under a condition that it is determined that there is a photodynamic energy electronic label which is not normally triggered to proceed to the working state, controlling the light intensity to be changed again and sending the querying signal to the photodynamic energy electronic label to query the state of the photodynamic energy electronic label; and repeating a step above at least once.

For example, after the sending the querying signal to the photodynamic energy electronic label to query the state of the photodynamic energy electronic label, the managing method further comprises: recording the photodynamic energy electronic label which is in the wakening and notifying the photodynamic energy electronic label that the wakening is normal wakening.

For example, the determined that there is a photodynamic energy electronic label which is not normally triggered to proceed to the working state includes: under a condition that a responding signal of the photodynamic energy electronic label in response to the querying signal is not received, determining the photodynamic energy electronic label as the photodynamic energy electronic label which is not normally triggered to proceed the working state.

At a third aspect, an embodiment of the present disclosure provides a managing apparatus of the photodynamic energy electronic label according to the first aspect, the managing apparatus comprises: a querying unit, configured to, after light intensity is controlled to be changed, send a querying signal to the photodynamic energy electronic label to query a state of the photodynamic energy electronic label and receive a responding signal which is sent by the photodynamic energy electronic label and responds to the querying signal; and a determining unit, configured to determine a photodynamic energy electronic label which is not normally triggered to proceed to a working state after the light intensity is controlled to be changed at least once as a to-be-processed label according to the responding signal.

For example, the managing apparatus further comprises a communicating unit connected to the querying unit and the determining unit, and configured to communicate with the photodynamic energy electronic label; the determining unit is further configured to determine a photodynamic energy electronic label which does not send out the responding signal as the photodynamic energy electronic label which is not normally triggered to proceed to the working state.

For example, the querying unit is further configured to after the querying signal is sent to the photodynamic energy electronic label to query the state of the photodynamic energy electronic label, record a photodynamic energy electronic label which is in the wakening and notify the wakened photodynamic energy electronic label that the wakening is normal wakening.

At a fourth aspect, an embodiment of the present disclosure provides a working method of the photodynamic energy electronic label according to the first aspect, the working method comprises: under a condition that the triggering circuit detects that an output of the photodynamic energy converter reaches a set condition, sending out a triggering signal to enable the photodynamic energy electronic label to be in a working state.

For example, the photodynamic energy electronic label further includes a processor connected with the triggering circuit; and the working state of the photodynamic energy electronic label includes a communicating state and an updating state, the working method further comprises enabling the processor to receive the triggering signal to be in the working state and sending out starting signals to different modules according to different working states.

For example, the photodynamic energy electronic label further includes a communicating module configured to communicate with a managing apparatus, the working method further comprises: under a condition that the managing apparatus sends out a querying signal, correspondingly sending out a responding signal by the photodynamic energy electronic label.

For example, the working method further comprises: receiving a normal wakening signal sent by the managing apparatus, and displaying or prompting the normal wakening signal to a user; and after receiving the normal wakening signal, when no triggering signal or no any signal sent by the managing apparatus is received in a third set time, enabling the photodynamic energy electronic label to proceed to a sleeping state.

For example, the set condition includes any one of: an absolute value of a signal change value of an output of the photodynamic energy converter is greater than or equal to a set value; and the output of the photodynamic energy converter reaches a preset value in a first set time.

BRIEF DESCRIPTION OF THE DRAWINGS

The above and/or additional aspects and advantages of the present disclosure will be more apparent and easily understood from the description of the embodiments in connection with the drawings related to the embodiments of the present disclosure, wherein.

DETAILED DESCRIPTION

Figure 1:
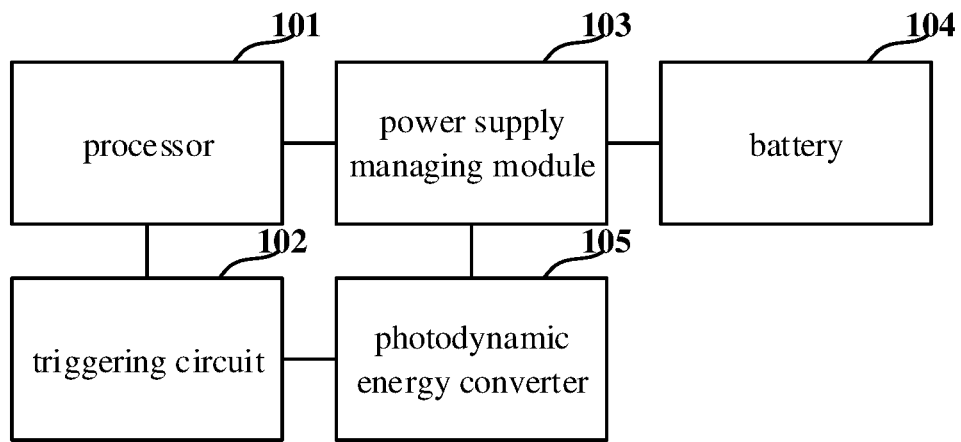
FIG. 1 is a structural schematic diagram of a photodynamic energy electronic label provided by an embodiment of the present disclosure.

Embodiments of the present disclosure will be in detail described hereinafter, and examples of the embodiments are shown in the drawings, in which the same or similar reference number is denoted as the same or similar members or the members with the same or similar function throughout. The described embodiments in conjunction with the accompanying drawings of the present disclosure are exemplary, only is used to explain the present disclosure and do not intend to limit the present disclosure.

In the description, the description with referring to the terms "an embodiment", "some embodiments", "example", "specific example" or "some examples" means that the specific feature, structure, material or character described with connection with the embodiment or example is included in at least one embodiment or example of the present disclosure. In the description, the schematic description of the above terms is not necessary to direct to the same embodiment or example. The described feature, structure, material or character may be combined in any suitable manner in any or a plurality of embodiments or examples. Further, in case of no conflict, different embodiments or examples and features in different embodiments or example described in the specification can be combined.

Further, the terms, such as "first," "second," or the like, which are used in the description and the claims of the present disclosure, are not intended to indicate or imply the relative importance or implicitly indicate the amount of the features. Thus, the features defined by "first," "second," may explicitly indicate or implicitly includes at least one feature. In the description of the present disclosure, Unless otherwise defined, "a plurality of" means two or more.

The present disclosure is described in detail below in connection with the accompanying drawings and embodiments. It can be understood that the embodiments described below are only used to explain the relevant embodiments of the present disclosure, and should not be construed as limit to the scope of embodiments of the present disclosure. Further, it should be noted that for ease of description, the accompanying drawings only show a portion relevant to the embodiments of the present disclosure.

It should be noted that in case of no conflict, the embodiments in the present application and the features in the embodiments may be combined mutually. The present application will be illustrated in detail with reference to the drawings and in connection with the embodiments.

With reference to FIG. 1, a photodynamic energy electronic label provided by an embodiment of the present disclosure includes: a processor 101, a triggering circuit 102, a power supply managing module 103, a battery 104 and a photodynamic energy converter 105, wherein The photodynamic energy converter 105 is used for converting light energy into electric energy;

The power supply managing module 103 is connected with the photodynamic energy converter 105, the processor 101 and the battery 104, and is used for providing the electric energy formed by converting the light energy to the processor 101 and the battery 104;

The triggering circuit 102 is connected with the photodynamic energy converter 105 and the processor 101, and is used for sending out a triggering signal to enable the photodynamic energy electronic label to be in a working state when an output of the photodynamic energy converter 105 reaches a set condition; and The processor 101 is connected with the triggering circuit and is configured to receive the triggering signal and proceed to a working state according to triggering of the triggering signal so as to enable the photodynamic energy electronic label to be in the working state.

The photodynamic energy converter 105 can convert the light energy into the electric energy, and the photodynamic energy electronic label is in a sleeping state at ordinary times; the triggering circuit 102 triggers the photodynamic energy electronic label to work when the output of the photodynamic energy converter 105 reaches the set condition; not only the photodynamic energy electronic label can convert the light energy into the electric energy to charge the battery and supply power to modules such as the processor 101, but also the modules such as the processor 101 are in a sleeping state at ordinary times and consume little energy; when the photodynamic energy electronic label needs to work, illumination on the photodynamic energy electronic label is controlled to enable the output of the photodynamic energy converter 105 to reach the set condition, and then the photodynamic energy electronic label proceeds to the working state under the triggering action of the triggering circuit 102, thereby achieving an effect of prolonging the service life of the electronic label.

The set condition may be a sudden increase in the output of the photodynamic energy converter 105 caused by sudden reinforcement of illumination, or a sudden increase in the output of the photodynamic energy converter 105 caused by sudden weakening of illumination, or may be that the output of the photodynamic energy converter 105 reaches a set change rule due to a change in illumination in a set mode, e.g., illumination is suddenly reinforced to reach a certain value and then suddenly weakened, or illumination is suddenly reinforced twice or the like.

For example, the set condition is that in a first set time, an absolute value of a change value of an output signal of the photodynamic energy converter is greater than or equal to a set value; and when the output of the photodynamic energy converter 105 is increased by the set value or reduced by the set value in the first set time with respect to a previous moment, the photodynamic energy electronic label is triggered to work.

For example, the output signal may be a voltage signal or a current signal.

The photodynamic energy converter 105 may adopt a photodynamic energy converting sheet, or any other module capable of collecting light energy and converting the light energy into electric energy.

Further, when the photodynamic energy electronic label is triggered to work, the processor 101 may be triggered to work first, and then the processor 101 triggers other modules to work according to actual demands at the time.

At the moment, sending out the triggering signal to enable the photodynamic energy electronic label to be in the working state may be that:

The triggering signal is sent out to trigger the processor to work; and

After proceeding to the working state, the processor triggers the corresponding module to work or sleep according to current demands.

For example, after the processor 101 proceeds to the working state, if communication needs to be carried out, the processor 101 triggers a communication-related module to work, and if display needs to be carried out, the processor 101 triggers a display-related module to work.

The processor 101 in the embodiments of the present disclosure may adopt a Micro Control Unit (MCU), and the triggering circuit 102 may interrupt a triggering signal triggering the MCU to work by an IO (Input/Output) port.

In one embodiment of the present disclosure, a triggering condition may be sudden reinforcement or sudden weakening of light; at the moment, intensity of the output signal of the photodynamic energy converter 105 also may be suddenly increased or suddenly weakened accordingly; and at the moment, the triggering circuit 102 may be that:

When the output signal of the photodynamic energy converter 105 is changed to the set value in a set time, the triggering circuit 102 triggers the processor to work.

Figure 2:
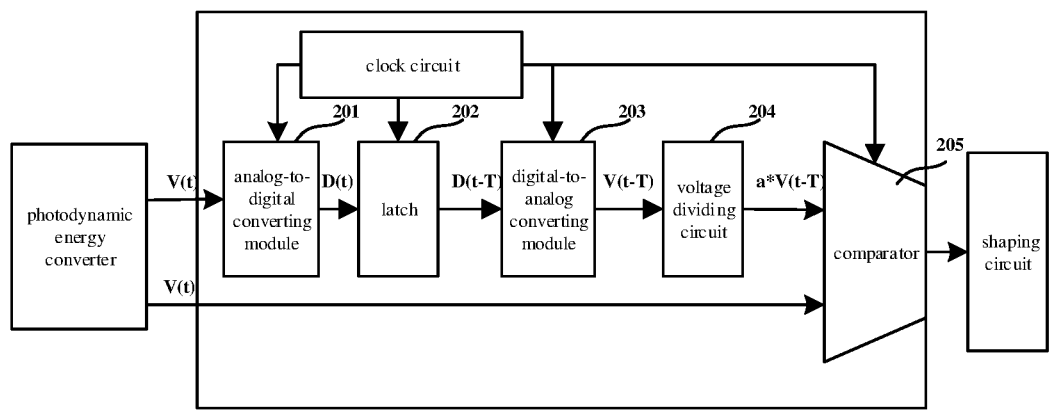
FIG. 2 is a structural schematic diagram of a triggering circuit in the photodynamic energy electronic label provided by the embodiment of the present disclosure.

When sudden reinforcement or weakening of the light is taken as the triggering condition, the structure of the triggering circuit 102 may be shown in FIG. 2, which may include:

An analog-to-digital converting module 201, configured to convert the voltage signal output by the photodynamic energy converter 105 into a digital signal;

A latch 202, configured to latch the digital signal output by the analog-to-digital converting module 201 for a set period T;

A digital-to-analog converting module 203, configured to convert the digital signal output by the latch 202 into an analog voltage signal;

A voltage dividing circuit 204, configured to carry out voltage division on the analog voltage signal output by the digital-to-analog converting module 203; and A comparator 205, configured to compare a signal output by the voltage dividing circuit 204 to the voltage signal output by the photodynamic energy converter 105, wherein when an absolute value of a difference between a voltage signal currently output by the photodynamic energy converter 105 and a voltage signal output by the photodynamic energy converter 105 in a previous period is greater than or equal to the set value, a signal output by the comparator 205 triggers the processor 101 to work.

For example, the set value may be 50%, 60% or more of a value of the output signal in the previous period, and the embodiments of the present disclosure do not make any limit thereto.

The voltage signal output by the photodynamic energy converter 105 is latched for one period by the latch 202 so as to implement comparison between the current output of the photodynamic energy converter 105 and the output of the photodynamic energy converter 105 in the previous period; and if the light is suddenly reinforced or weakened, the difference between the current output of the photodynamic energy converter 105 and the output of the photodynamic energy converter 105 in the previous period is large so as to trigger the processor 101 to work.

A voltage output by the photodynamic energy converter 105 is converted into a digital signal by the analog-to-digital converting module, a digital amount of a voltage value is input into the latch, and an updating period of the latch is T; and an output voltage of the latch is converted into an analog voltage signal by the digital-to-analog converting module, and is output to the comparator through the voltage dividing circuit, wherein a voltage dividing ratio of the voltage dividing circuit is a, and the voltage dividing ratio may be regulated according to testing light intensity in the actual field. Assuming that $V_1$ is a voltage output by the photodynamic energy converting sheet when a triggering lamp is not turned on, $V_2$ is a voltage output by the photodynamic energy converting sheet when the triggering lamp is turned on, a may be determined according to a formula below:

$$a = \frac{V_1 + V_2}{2V_2}$$

In order to avoid that under a condition that the electronic label is triggered due to a false triggering case, the energy consumption is larger, and thus, after the electronic label is triggered to start to work, it may be specified that if a signal sent by a managing apparatus is not received in the set time, the electronic label proceeds to a sleeping state, and at the moment, the processor 101 is further used for:

After being triggered to start to work, if the signal sent by the managing apparatus is not received in a second set time, proceeding to a sleeping state again; and After receiving the signal sent by the managing apparatus, if no triggering signal or not any signal sent by the managing apparatus is received in a third set time, proceeding to the sleeping state and enabling the photodynamic energy electronic label to proceed to the sleeping state.

Figure 3:
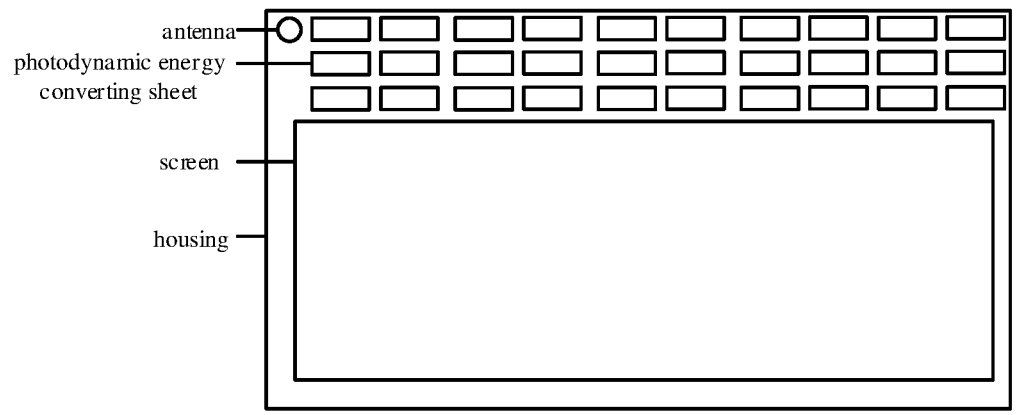
FIG. 3 is a schematic diagram of a housing of the photodynamic energy electronic label provided by the embodiment of the present disclosure.

In one embodiment of the present disclosure, a housing of the photodynamic energy electronic label nay be as shown in FIG. 3, and a photodynamic energy converting sheet is installed on the housing as the photodynamic energy converter 105 and used for collecting light energy and converting the light energy into electric energy to provide the electric energy for the electronic label. An antenna and a screen also may be arranged on the housing.

Figure 4:
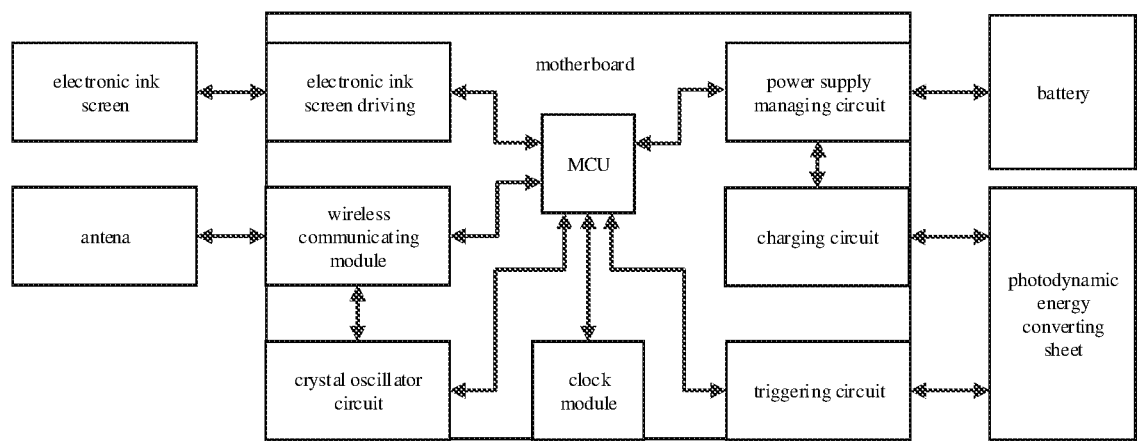
FIG. 4 is a schematic diagram of motherboard hardware structure of the photodynamic energy electronic label provided by the embodiment of the present disclosure.

For example, a motherboard hardware structure of the photodynamic energy electronic label may be as shown in FIG. 4, including: an MCU, a clock module, a display screen driving circuit, a wireless communicating module, a crystal oscillator circuit, a triggering circuit, a charging circuit and a power supply managing circuit, wherein the charging circuit and the power supply managing circuit may be combined as the power supply managing module.

For example, the display screen driving circuit may be an electronic ink screen driving circuit.

MCU: in the embodiments of the present disclosure, the MCU has an Input/Output (JO) function, a serial port communicating function, a Serial Peripheral Interface (SPI) communicating function, an Inter-Integrated Circuit (I2C) communicating function, an Analog-to-Digital (AD) conversion function and an external IO port interrupt function, and the MCU may work in a sleeping mode, may work in a deep sleeping mode, may be wakened from the sleeping mode, and may be wakened by external IP triggering.

Clock module: the clock module may carry out timing independently and supports reading real time. The clock module may communicate with the MCU by an I2C or an SPI, supports reading the real time and supports generating the triggering signal regularly.

Crystal oscillator circuit: the crystal oscillator circuit may generate oscillation clock source signals of various frequencies, may provide a system clock for the MCU, and may provide a wireless communicating clock source for the wireless communicating module.

Wireless communicating module: the wireless communicating module may communicate with the MCU by a serial port or the SPI, and may transmit data sent to the wireless communicating module by the MCU to other devices through a certain protocol. The wireless communicating module may support wireless communicating solutions such as 2.4G wireless communication, 433 MHz wireless communication, 868 MHz wireless communication, 915 MHz wireless communication and the like, and can load Bluetooth Low Energy (BLE) Bluetooth, zigbee, LoRa, Z-ware, EnOcean or other standard wireless communicating protocols or customized wireless communicating protocols. The wireless communicating module is connected with an external antenna, and can improve communication quality.

Display screen driving circuit: the display screen driving circuit is used for driving a display screen, e.g., an electronic ink screen, and is provided with a switching circuit and the display screen driving circuit may be controlled to be powered on or off by an IO port of the MCU, so as to control a working state of the display screen. The module is connected with the display screen.

Charging circuit: the charging circuit is connected with the photodynamic energy converting sheet, includes a power supply protecting circuit, a boosting circuit and a filtering circuit, and takes charge of boosting and filtering the electric energy generated by the photodynamic energy converting sheet so as to provide the electric energy to the power supply managing circuit, thereby charging the battery and providing a power supply for a motherboard.

Power supply managing circuit: the power supply managing circuit takes charge of keeping a voltage of the motherboard stable, coordinating an energy flowing direction and charging the battery.

Triggering circuit: the triggering circuit uses a voltage of the photodynamic energy converting sheet as a signal source, acquires a voltage change of the photodynamic energy converting sheet, converts the voltage change into an MCU wakening triggering signal and takes charge of wakening the MCU from the sleeping state.

In a state of no triggering signal, the motherboard is in the sleeping state; when the triggering signal is received, the triggering circuit converts an optical signal into an IO port interrupt triggering signal of the MCU, the MCU is triggered to be wakened, and the motherboard proceeds to a communicating state; after communication is completed, the motherboard proceeds to an updating state; and after update is completed, the motherboard proceeds to the sleeping state again.

For example, the working state of the photodynamic energy electronic label includes the updating state and the communicating state.

In the sleeping state, the MCU is in the sleeping mode, a peripheral clock and a timer clock are closed, and the AD module is closed to wait to externally interrupt triggering signal; and the display screen driving circuit, e.g., the electronic ink screen driving circuit, is in a power-off mode, the wireless communicating module is in the power-off mode, and the clock module is in a working mode;

In the communicating state, the MCU is in a low-power-consumption working mode, the peripheral clock and the timer clock are opened, and the AD module is in the working state; the display screen driving circuit, e.g., the electronic ink screen driving circuit, is in the power-off mode, the wireless communicating module is in the working mode and implements transceiving of data, battery voltage information is sampled by the AD module and is sent to an external device by the wireless module, the clock module is in the working mode, and the MCU receives a time synchronizing command transmitted by the wireless module to synchronize the system clock; and In the updating state, the MCU is in the low-power-consumption working state, the peripheral clock and the timer clock are opened, and the AD module is closed; and the display screen driving circuit, e.g., the electronic ink screen driving circuit, is in the working mode, the wireless communicating module is in the power-off mode, the clock module is in the working mode, and the MCU controls the display screen driving circuit, e.g., the electronic ink screen driving circuit, to implement update of display contents.

Usually, the electronic label is in the sleeping state; when the output of the photodynamic energy converter reaches the set condition, the MCU is triggered to proceed to the working mode; generally, when the MCU proceeds to the working mode, the electronic label needs to be updated; the electronic label firstly proceeds to the communicating state to receive data; and after data is received, the electronic label proceeds to the updating state to be updated.

Figure 5:
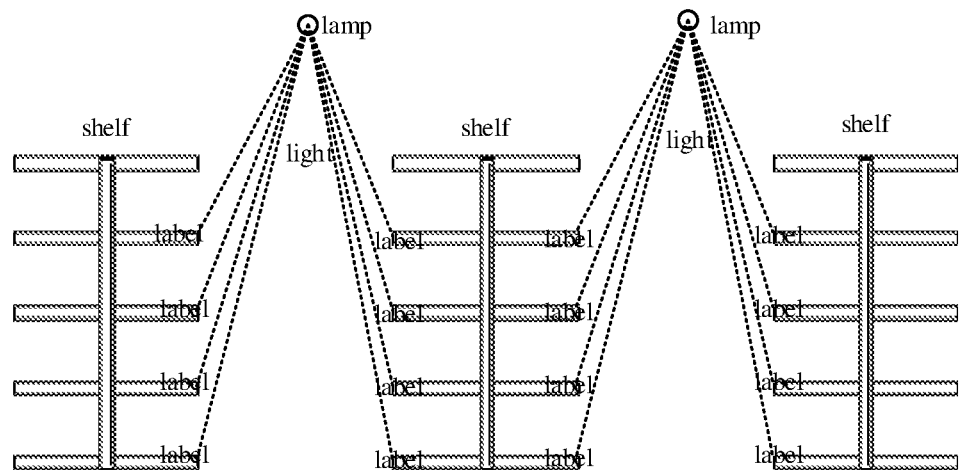
FIG. 5 is a schematic diagram of positions of a photodynamic energy electronic label provided by an embodiment of the present disclosure and a fluorescent lamp for triggering.

A position of the photodynamic energy electronic label in the embodiments of the present disclosure may be disposed as shown in FIG. 5, so that each photodynamic energy electronic label can be irradiated by a fluorescent lamp for triggering, when the photodynamic energy electronic label needs to be triggered for updating, the fluorescent lamp for triggering is turned on under the control of a manager, then indoor light intensity is suddenly improved, and when the photodynamic energy electronic label receives a light intensity change signal, a signal change is detected by the triggering circuit, and the light intensity signal is changed into an electric signal to trigger wakening of the MCU.

The fluorescent lamp for triggering irradiates the electronic labels from obliquely above so as to ensure that the photodynamic energy electronic label on both the top layer and the bottom layer can receive a light source signal of the triggering lamp.

After the photodynamic energy electronic label is triggered to be wakened, the managing apparatus of the photodynamic energy electronic label may send out a querying signal, query a state of the label, record the wakened label and simultaneously notify the label that the wakening is normal wakening. For the false triggering problem caused by accidentally illumination reinforcement, after the photodynamic energy electronic label is triggered to be wakened, if the querying signal is not received in the second set time (e.g., in three minutes), it is illustrated that the label is abnormally wakened, and the label automatically proceeds to the sleeping mode; and for a case of not triggering due to factors of accidental shielding and the like, after a gateway wakens the label, if a label which is not wakened is queried in a set time, a control terminal is reminded to resend out a wakening signal, and if there is still the label which is not wakened, the manager is prompted to carry out manual processing.

Figure 6:
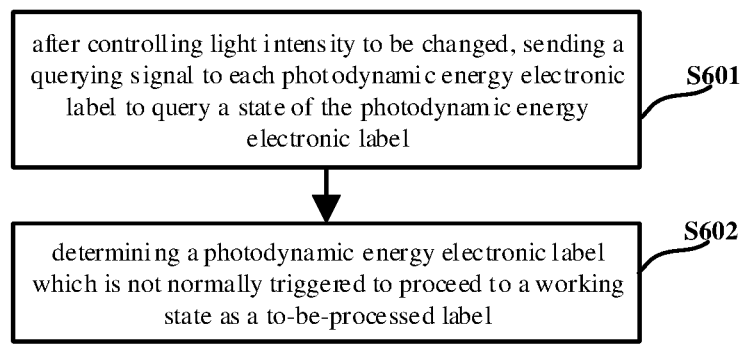
FIG. 6 is a flow chart of a managing method of a photodynamic energy electronic label, as provided by an embodiment of the present disclosure.

An embodiment of the present disclosure further correspondingly provides a managing method of a photodynamic energy electronic label, as shown in FIG. 6, including:

S601: after controlling light intensity to be changed, sending a querying signal to each photodynamic energy electronic label to query a state of the photodynamic energy electronic label; and S602: determining a photodynamic energy electronic label which is not normally triggered to proceed to a working state as a to-be-processed label.

For the to-be-processed label, a worker may be notified to process it.

In order to reduce the number of manual interventions, the photodynamic energy electronic label which is not normally triggered may be triggered again for a set number of times, and at the moment, before the step S602, the managing method further includes:

When it is determined that there is a photodynamic energy electronic label which is not normally triggered to proceed to the working state, controlling the light intensity to be changed again and sending the querying signal to each photodynamic energy electronic label to query the state of the photodynamic energy electronic label; and Repeating the step above at least once.

In order to manage the photodynamic energy electronic label better, after the step S601 of sending the querying signal to each photodynamic energy electronic label to query the state of the photodynamic energy electronic label, the managing method further includes:

Recording the wakened photodynamic energy electronic label and notifying the wakened photodynamic energy electronic label that the wakening is normal wakening.

It should be noted that operations of the method of the present disclosure are described in the drawing in a specific sequence, but it does not request or denote that those operations must be executed in that specific sequence, or all the shown operations must be executed to achieve a desired result. On the contrary, the execution sequence of the steps described in the flow chart may be changed. Additionally or alternatively, some steps may be omitted, a plurality of steps may be merged into one step to execute, and/or one step is decomposed into a plurality of steps to execute.

Figure 7:
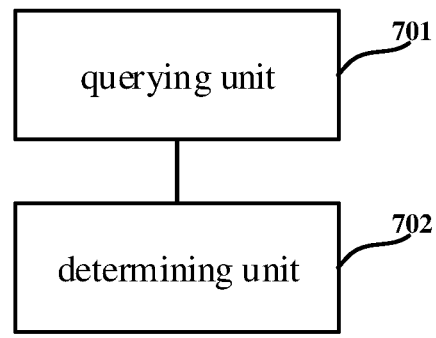
FIG. 7 is a structural schematic diagram of a managing apparatus of a photodynamic energy electronic label, as provided by an embodiment of the present disclosure.

An embodiment of the present disclosure further correspondingly provides a managing apparatus of a photodynamic energy electronic label, as shown in FIG. 7, including:

A querying unit 701, configured to, after light intensity is controlled to be changed, send a querying signal to the photodynamic energy electronic label to query a state of the photodynamic energy electronic label and receive a responding signal which is sent by the photodynamic energy electronic label and responds to the querying signal; and A determining unit 702, configured to determine a photodynamic energy electronic label which is not normally triggered to proceed to a working state after the light intensity is controlled to be changed at least once as a to-be-processed label according to the responding signal.

For example, the apparatus further includes:

A communicating unit, connected to the querying unit and the determining unit, and configured to communicate with the photodynamic energy electronic label.

Further, the determining unit 702 is further used for:

determining a photodynamic energy electronic label which does not send out the responding signal as the photodynamic energy electronic label which is not normally triggered to proceed to the working state.

Further, the querying unit 701 is further used for:

After the querying signal is sent to each photodynamic energy electronic label to query the state of the photodynamic energy electronic label, recording a wakened photodynamic energy electronic label and notifying the wakened photodynamic energy electronic label that the wakening is normal wakening.

An embodiment of the present disclosure further provides a working method of any one photodynamic energy electronic label as mentioned above, including: when the triggering circuit detects that an output of the photodynamic energy converter reaches a set condition, sending out a triggering signal to enable the photodynamic energy electronic label to be in a working state.

For example, the photodynamic energy electronic label further includes: a processor, connected with the triggering circuit; the working state of the photodynamic energy electronic label includes a communicating state and an updating state; and the working method further includes: enabling the processor to receive the triggering signal to be in the working state, and sending out starting signals to different modules according to different working states.

For example, the photodynamic energy electronic label further includes: a communicating module, configured to communicate with a managing apparatus; and the working method further includes: when the managing apparatus sends out a querying signal, correspondingly send out a responding signal by the photodynamic energy electronic label.

For example, the working method further includes:

Receiving a normal wakening signal sent by the managing apparatus, and displaying or prompting the normal wakening signal to a user; and After receiving the normal wakening signal, when no triggering signal or not any signal sent by the managing apparatus is received in a third set time, enabling the photodynamic energy electronic label to proceed to a sleeping state.

For example, the set condition includes any one of:

According to a change of the controlled light intensity, an absolute value of a change value of an output of the photodynamic energy converting module is greater than or equal to a set value; and According to the change of the controlled light intensity, the output of the photodynamic energy converting module is reduced after being increased to a second set value.

The embodiments of the present disclosure provide a photodynamic energy electronic label, a working method thereof, a managing method and a managing apparatus thereof. The photodynamic energy electronic label includes a triggering circuit and a photodynamic energy converter. The photodynamic energy converter may convert light energy into electric energy, the photodynamic energy electronic label is in a sleeping state at ordinary times, the triggering circuit triggers the photodynamic energy electronic label to work when output of the photodynamic energy converter reaches a set condition, not only the photodynamic energy electronic label can convert the light energy into the electric energy to charge the battery and supply power to the modules such as the processor, but also the modules such as the processor are in the sleeping state at ordinary times and consume little energy, and when the photodynamic energy electronic label needs to work, illumination on the photodynamic energy electronic label is controlled to enable the output of the photodynamic energy converter to reach the set condition and then the photodynamic energy electronic label proceeds to the working state under the triggering action of the triggering circuit, thereby achieving an effect of prolonging the service life of the electronic label.

It should be understood that each unit or module recorded in the apparatus corresponds to each step in the method described with reference to FIG. 2. Therefore, the operations and the characteristics described above regarding the method are also applicable to the apparatus and the units included therein, and are not repeated herein. The apparatus may be implemented in a browser or other security applications of an electronic device in advance, and also may be loaded into the browser or other security applications of the electronic device in modes of downloading and the like. The corresponding units in the apparatus may be matched with units in the electronic device so as to implement the solutions of the embodiments of the present application.

The flow chart and the block diagrams in the drawings show system architectures, functions and operations of a system, a method and a computer program product according to various embodiments of the present disclosure, which may be implemented. In this regard, each block in the flow chart or the block diagrams may represent one module, a program segment or one part of codes, and the module, the program segment or one part of codes includes one or more executable instructions for achieving specified logic functions. It also should be noted that in some implementations as replacements, the functions labeled in the blocks also may be achieved in a sequence different from a sequence labeled in the drawings. For example, two continuously shown blocks actually may be executed substantially in parallel, and they may sometimes be executed in a reverse sequence, and it is determined by the related functions. It also should be noted that each block in the block diagrams and/or the flow chart and a combination of the blocks in the block diagrams and/or the flow chart may be implemented by a special hardware-based system for executing the specified function or operation, or may be implemented by a combination of special hardware or a computer instruction.

The related units or modules described in the embodiments of the present application may be implemented in a software mode, and also may be implemented in a hardware mode. The described units or modules also may be arranged in the processor, and for example, it may be described that a processor includes an XX unit, a YY unit and a ZZ unit, wherein names of those units or modules do not constitute the limitation to the units or the modules in some cases, and for example, the XX unit also may be described as "the unit for XX".

In another aspect, the present application further provides a computer readable storage medium. The computer readable storage medium may be the computer readable storage medium included in the apparatus in the above-mentioned embodiments, and also may be a computer readable storage medium which exists independently and is not assembled into the device. The computer readable storage medium stores one or more program, and the program is used by one or more processors for executing a formula inputting method described in the present application.

The above are only the preferred embodiments of the present application and illustration on the applied technical principle. Those skilled in the art should understand that the related scope of the present application is not limited to the technical solutions formed by specifically combining the technical characteristics, and meanwhile, also should cover other technical solutions formed by randomly combining the technical characteristics or equivalent characteristics thereof without departure from the conception of the present disclosure, e.g., the technical solutions formed by carrying out mutual replacement on the characteristics and technical characteristics which are disclosed (but not limited to) in the present application and have the similar functions.

The present application claims a priority of Chinese Patent Application No. 201810538854.3, filed on May 30, 2018, the content of which is cited by the full text as a part of this application.

The invention claimed is:

1. A photodynamic energy electronic label, comprising:
a photodynamic energy converter, configured to convert light energy into electric energy; and
a triggering circuit, connected with the photodynamic energy converter and configured to send out a triggering signal to enable the photodynamic energy electronic label from being in a sleeping state consuming little energy to being in a working state when an output of the photodynamic energy converter reaches a set condition due to illumination on the photodynamic energy electronic label,
wherein the set condition is:
an absolute value of a change value of the output of the photodynamic energy converter is greater than or equal to a set value,
wherein the triggering circuit includes:
an analog-to-digital converting module, configured to convert a voltage signal output by the photodynamic energy converter into a digital signal;
a latch, configured to latch the digital signal output by the analog-to-digital converting module for a set period T;
a digital-to-analog converting module, configured to convert the digital signal output by the latch into an analog voltage signal;
a voltage dividing circuit, configured to carry out voltage division on the analog voltage signal output by the digital-to-analog converting module, to output a voltage-divided signal; and
a comparator, configured to compare the voltage-divided signal output by the voltage dividing circuit to a voltage signal output by the photodynamic energy converter, and when an absolute value of a difference between a voltage signal currently output by the photodynamic energy converter and a voltage signal output by the photodynamic energy converter in a previous period is greater than or equal to the set value, the comparator outputting the triggering signal.

2. The photodynamic energy electronic label according to claim 1, further comprising:
a processor, connected with the triggering circuit and configured to receive the triggering signal and proceed to a working state according to triggering of the triggering signal, so as to enable the photodynamic energy converter to be in the working state.

3. The photodynamic energy electronic label according to claim 2, further comprising:
a battery, configured to supply power to the photodynamic energy electronic label; and
a battery managing module, connected with the photodynamic energy converter, the battery and the processor, and configured to supply the electric energy provided by the photodynamic energy converter to the processor and the battery.

4. The photodynamic energy electronic label according to claim 2, wherein the processor is a Micro Control Unit, and the triggering signal is an Input/Output port interrupt triggering signal.

5. The photodynamic energy electronic label according to claim 1, wherein the working state of the photodynamic energy electronic label includes an updating state and a communicating state, and the processor is configured to trigger different modules to work or sleep in different working states.

6. The photodynamic energy electronic label according to claim 5, further comprising:
a wireless communicating module, configured to implement data transceiving of the photodynamic energy electronic label and the managing apparatus; and
a display screen driving circuit, configured to provide display contents to a display screen,
wherein in the communicating state, the processor triggers the wireless communicating module to work, and in the updating state, the processor enables the wireless communicating module to sleep, triggers the displaying screen driving circuit to work and updates the display contents.

7. The photodynamic energy electronic label according to claim 1, wherein the processor is further configured to:
after being triggered to proceed to the working state, if a signal sent by a managing apparatus is not received in a second set time, proceed to a sleeping state again; and
after receiving the signal sent by the managing apparatus, when no triggering signal or no any signal sent by the managing apparatus is received in a third set time, proceed to the sleeping state and enable the photodynamic energy electronic label to proceed to a sleeping state.

8. A managing method of the photodynamic energy electronic label according to claim 1, comprising:
after controlling light intensity to be changed, sending a querying signal to the photodynamic energy electronic label to query a state of the photodynamic energy electronic label; and determining a photodynamic energy electronic label which is not normally triggered to proceed to a working state as a to-be-processed label.

9. The managing method according to claim 8, before the determining the photodynamic energy electronic label which is not normally triggered to proceed to the working state as the to-be-processed label, further comprising:
under a condition that it is determined that there is a photodynamic energy electronic label which is not normally triggered to proceed to the working state, controlling the light intensity to be changed again and sending the querying signal to the photodynamic energy electronic label to query the state of the photodynamic energy electronic label; and
repeating a step above at least one time.

10. The managing method according to claim 9, wherein the determined that there is a photodynamic energy electronic label which is not normally triggered to proceed to the working state includes:
under a condition that a responding signal of the photodynamic energy electronic label in response to the querying signal is not received, determining the photodynamic energy electronic label as the photodynamic energy electronic label which is not normally triggered to proceed the working state.

11. The managing method according to claim 8, after the sending the querying signal to the photodynamic energy electronic label to query the state of the photodynamic energy electronic label, further comprising:
recording the photodynamic energy electronic label which is in the wakening and notifying the photodynamic energy electronic label that the wakening is normal wakening.

12. A managing apparatus of the photodynamic energy electronic label according to claim 1, comprising:
a querying unit, configured to, after light intensity is controlled to be changed, send a querying signal to the photodynamic energy electronic label to query a state of the photodynamic energy electronic label and receive a responding signal which is sent by the photodynamic energy electronic label and responds to the querying signal; and
a determining unit, configured to determine a photodynamic energy electronic label which is not normally triggered to proceed to a working state after the light intensity is controlled to be changed at least once as a to-be-processed label according to the responding signal.

13. The managing apparatus according to claim 12, further comprising:
a communicating unit, connected to the querying unit and the determining unit, and configured to communicate with the photodynamic energy electronic label;
the determining unit being further configured to:
determine a photodynamic energy electronic label which does not send out the responding signal as the photodynamic energy electronic label which is not normally triggered to proceed to the working state.

14. The managing apparatus according to claim 12, wherein the querying unit is further configured to:
after the querying signal is sent to the photodynamic energy electronic label to query the state of the photodynamic energy electronic label, record a photodynamic energy electronic label which is in the wakening and notify the wakened photodynamic energy electronic label that the wakening is normal wakening.

15. A working method of a photodynamic energy electronic label, wherein the photodynamic energy electronic label comprises:
a photodynamic energy converter, configured to convert light energy into electric energy; and
a triggering circuit, connected with the photodynamic energy converter and configured to send out a triggering signal to enable the photodynamic energy electronic label from being in a sleeping state consuming little energy to being in a working state when an output of the photodynamic energy converter reaches a set condition due to illumination on the photodynamic energy electronic label,
wherein the set condition is:
an absolute value of a change value of the output of the photodynamic energy converter is greater than or equal to a set value,
wherein the triggering circuit includes:
an analog-to-digital converting module, configured to convert a voltage signal output by the photodynamic energy converter into a digital signal;
a latch, configured to latch the digital signal output by the analog-to-digital converting module for a set period T;
a digital-to-analog converting module, configured to convert the digital signal output by the latch into an analog voltage signal;
a voltage dividing circuit, configured to carry out voltage division on the analog voltage signal output by the digital-to-analog converting module, to output a voltage-divided signal; and
a comparator, configured to compare the voltage-divided signal output by the voltage dividing circuit to a voltage signal output by the photodynamic energy converter, and when an absolute value of a difference between a voltage signal currently output by the photodynamic energy converter and a voltage signal output by the photodynamic energy converter in a previous period is greater than or equal to the set value, the comparator outputting the triggering signal,
wherein the working method comprises:
under a condition that the triggering circuit detects that an output of the photodynamic energy converter reaches a set condition due to illumination on the photodynamic energy electronic label, sending out a triggering signal to enable the photodynamic energy electronic label from being in a sleeping state consuming little energy to being in a working state,
the set condition is:
an absolute value of a change value of the output of the photodynamic energy converter is greater than or equal to a set value.

16. The working method according to claim 15, wherein the photodynamic energy electronic label further includes:
a processor, connected with the triggering circuit; and
the working state of the photodynamic energy electronic label includes a communicating state and an updating state,
the working method further comprising:
enabling the processor to receive the triggering signal to be in the working state, and sending out starting signals to different modules according to different working states.

17. The working method according to claim 15, wherein the photodynamic energy electronic label further includes:
a communicating module, configured to communicate with a managing apparatus, the working method further comprising:

under a condition that the managing apparatus sends out a querying signal, correspondingly sending out a responding signal by the photodynamic energy electronic label.

18. The working method according to claim 17, further comprising:

receiving a normal wakening signal sent by the managing apparatus, and displaying or prompting the normal wakening signal to a user; and after receiving the normal wakening signal, when no triggering signal or no any signal sent by the managing apparatus is received in a third set time, enabling the photodynamic energy electronic label to proceed to a sleeping state.

* * * * *